United States Patent [19]

Krohn

[11] 4,289,516

[45] Sep. 15, 1981

[54] LOW LOSS OPTICAL FIBERS

[75] Inventor: David A. Krohn, Hamden, Conn.

[73] Assignee: EOTEC Corporation, West Haven, Conn.

[21] Appl. No.: 81,771

[22] Filed: Oct. 4, 1979

[51] Int. Cl.³ ............................................. C03C 25/02
[52] U.S. Cl. ........................................ 65/3 A; 65/13; 65/121; 427/163
[58] Field of Search ...................... 65/3 A, 13, 2, 121; 427/163 F

[56] References Cited

U.S. PATENT DOCUMENTS

| 4,116,653 | 9/1978 | Irvin | 427/163 F X |
| 4,155,733 | 5/1979 | Sandbank et al. | 65/121 X |

FOREIGN PATENT DOCUMENTS

| 2545317 | 4/1977 | Fed. Rep. of Germany | 65/3 A |
| 1134466 | 11/1968 | United Kingdom | 65/3 A |

Primary Examiner—Robert L. Lindsay, Jr.
Attorney, Agent, or Firm—Darby & Darby

[57] ABSTRACT

A method is provided for making an optical fiber by melting and cladding a multi-component core glass without adding the contamination that is normally associated with these processes. As an initial step, a pure multi-component glass is melted in a high purity silica crucible. The temperature of the glass in the crucible and the temperature of the orifice thereof are controlled so that a cane of glass is drawn from the bottom of the crucible. This cane of glass is fed into a silica or borosilicate tube which is being drawn into a fiber. This results in an optical fiber in which the multi-component glass forms the core while the tube forms the cladding.

6 Claims, 2 Drawing Figures

U.S. Patent
Sep. 15, 1981
4,289,516
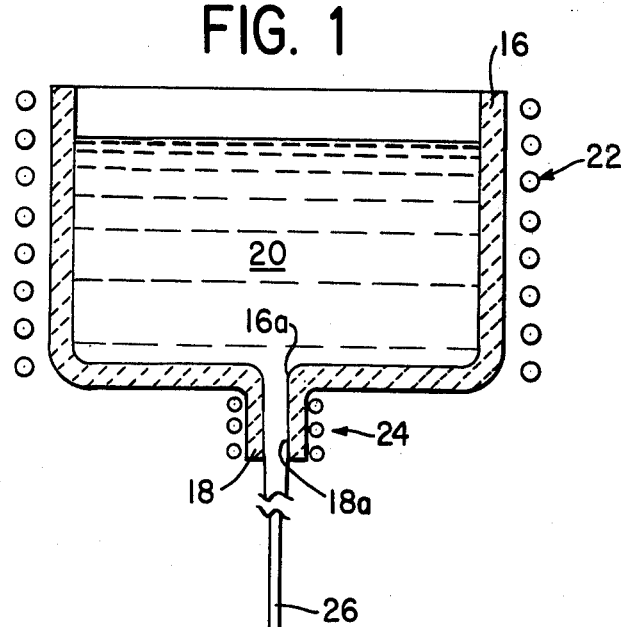
FIG. 1
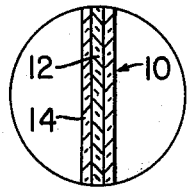
FIG. 2
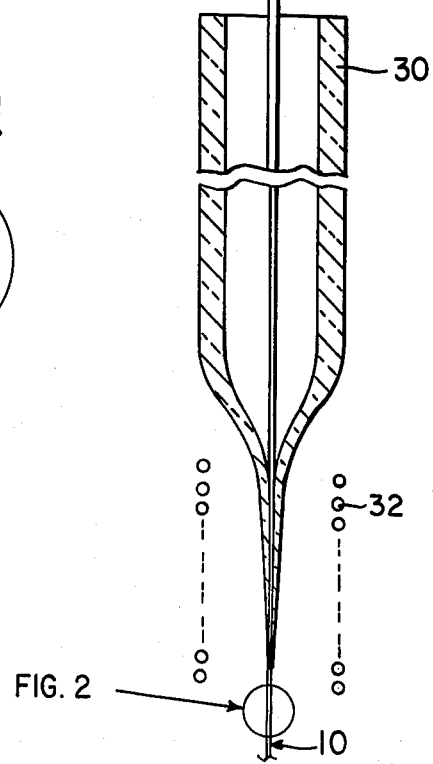

LOW LOSS OPTICAL FIBERS

This invention relates to optical fibers and, more particularly, to a method capable of manufacturing low loss, high numerical aperture optical fibers.

Optical fibers (or optical waveguides as they are sometimes called) should have minimum transmission losses and, in many applications, the ability to gather or accept light from the widest possible angle. These properties enable the maximum transfer of energy by the fiber from a light source to an output device.

Known optical fibers comprise a glass core enveloped by a glass cladding layer having an index of refraction ($n_2$) less than the index of refraction of the core material ($n_1$). Simply stated, the difference between these indices causes light rays entering the fiber within a specified angle to be reflected internally and thereby transmitted through the fiber. The "cone" of light which can be accepted by a fiber is known as the angle of acceptance and the sine of this angle is referred to as the numerical aperture (NA) of the fiber. For any fiber:

$$NA = (n_1^2 - n_2^2)^{\frac{1}{2}}$$

The higher the numerical aperture, the greater the ability of the fiber to gather light. For numerical aperture equal to one, the angle of acceptance is 90° which means that all of the light striking the face of the fiber will be coupled into it.

The causes for loss in a fiber are material absorption, material scattering, cladding loss and geometry loss. Material absorption losses occur because of transition metal ions and OH groups in the glass that absorb light [e.g. 1 part per million iron will result in a loss of 100 db per km at 800 mm (nanometers)]. Material scattering is due to imperfections in the fiber core, primarily bubbles, microcracks and debris. Cladding loss exists because of imperfections at the core-cladding interface. Geometry loss is due to bends in the fiber and is an inverse function of numerical aperture. A low loss fiber should have losses no greater than 150 db per km.

Typically, the cladding material of an optical fiber is fused silica ($SiO_2$) of high purity although other glasses such as borosilicates are also used. The core may be a silica glass to which modifiers are added to increase the index of refraction (and the numerical aperture). Suitable modifiers for this purpose include lead oxide (PbO) barium oxide (BaO) and germanium dioxide ($GeO_2$). These modifiers, in turn, may cause problems of glass stability, and agents such as calcium, zinc, or alumina may be added as stabilizing agents. To facilitate melting of the glass (for drawing), fluxing agents such as the oxides of the alkali metals (potassium, sodium and lithium) may also be added.

The introduction of these various agents or components into the core glass creates problems insofar as contamination and, therefore, material absorption losses are concerned. The various components themselves may be sources of contaminants but, equally important, the procedure by which a multi-component glass is made can add contaminants which cause substantial material absorption losses.

Various techniques are used to make optical fibers. In the simplest procedure, a rod of core material is placed within a tube of cladding material, the temperature raised, and the rod and tube drawn to the desired cross-sectional area (see U.S. Pat. No. 3,659,915). Fibers manufactured by this process cannot be used in some cases (e.g. for communications) because of excessive losses and dispersion.

The most important processes for making low loss fiber optics are known as the double crucible process, the chemical vapor deposition process and the ion leaching process.

In the double crucible process a platinum or ceramic outer crucible contains the cladding glass. Inside the outer crucible is another platinum or ceramic crucible in which the core glass is melted. A fiber is drawn by pulling the core glass inside of the cladding glass. The process is capable of producing glasses with high numerical aperture; however, it is limited to moderate loss because of geometric inconsistencies associated with drawing glasses which are in a very fluid state and also because the ceramic or platinum crucibles cause contamination of the glass materials.

In the chemical vapor deposition process, pure chemicals (for example, silica tetrachloride, germanium tetrachloride and boron chloride) are passed into a manifold with oxygen. They are then mixed and fed into a rotating high purity fused silica tube in which flame traverses the tube while it is rotating. The result is that the silica is oxidized and deposited on the inside of the high purity fused silica tube. The deposit is doped with germanium dioxide and the tube is then collapsed and drawn. In a recent form of this process, the pure chemical was potassium metal which, through vapor deposition, produced a potassium silicate glass. The composition produced by vapor depositon can be readily controlled and yields a low to moderate numerical aperture with low loss. However, the process has associated with it limited pre-form size, which inhibits large scale production, and core defects may arise when the tube is collapsed.

In the ion leaching process, a borosilicate glass rod is heat treated. During the heat treatment the glass phase separates and the impurities migrate to the second phase. The glass is then acid leached and the second phase along with the impurities removed from the core glass yeilding a high purity microporous silica glass. A high purity dopant (for example, cesium) is introduced and the surface washed so that the surface is dopant free while the interior still contains the dopant. Then the micro-pores are collapsed at high temperature to form a preform and the fiber is drawn. This process yields low or moderate numerical aperture and moderate loss although the process may be able to yield low loss. Also, there are many steps involved and in many of the early steps the preform is unstable due to mechanical weakness so that yield can be a problem.

British Patent No. 1,340,849 (Uffen) discloses a process for manufacturing optical fibers wherein a tube of cladding material serves as a crucible in which the core glass is melted. The batch for the core glass is premixed and introduced into the tube in a powder form, with particle sizes chosen so that, when a fine rain of the powder mixture falls on the surface of the hot melt, volatile products may be uninteruptedly evolved. To form the optical fiber the bottom of the tube is drawn, resulting in a core glass filled cladding. The Uffen process has the potential to retain purity (enhancing efficiency) and the ability to enable control of numerical aperture. Moreover, it is not limited as to preform size and, consequently, is capable of large scale production. As such, this process has important advantages over other fiber manufacturing processes including the double crucible process, the chemical vapor deposition process, and the ion leaching process.

The Uffen process does, however, have a number of shortcomings which limit its usefulness. The use of the cladding material tube as a crucible represents a limitation on purity, since impurities produced upon initial melting of the batch material and upon its reaction with the cladding at the interface therewith can be deposited and remain in the cladding material. Typically, special precautions must be taken to avoid this. In addition, since the tube serves as a crucible it must be made of a high melting temperature cladding material, such as silica, which tends to have a substantially lower draw rate than lower melting temperature cladding materials, such as borosilicate. This represents a limitation on production speed. With current concerns about energy consumption, it also becomes disadvantageous to use a tubing material, such as silica, which must be brought to a high temperature in order to be drawn.

The main object of this invention is to provide optical fibers with low loss and high numerical aperture. It is another object of the present invention to manufacture optical fibers of this type by a process which overcomes one or more of the shortcomings of existing processes.

It is a specific object of the present invention to provide a process for manufacturing high numerical aperture optical fibers without adding appreciable contamination during processing.

It is a further object of the present invention to provide a process for manufacturing optical fibers of the type described having a relatively small number of processing steps, so that good yields may be obtained in large scale production.

It is yet another object of the present invention to provide a process for manufacturing optical fibers which is relatively fast and energy efficient.

It is also an object of the present invention to provide a process for manufacturing optical fibers of the type described, which process may be adapted for substantially continuous operation, whereby reduced costs may be achieved without any losses in quality of the product.

In accordance with an illustrative embodiment demonstrating objects and features of the present invention, a method is provided for melting and cladding a multi-component core glass without adding the contamination that is normally associated with these processes. As an initial step, a pure multi-component glass is melted in a high purity silica crucible. The temperature of the glass in the crucible and the temperature of the orifice thereof are controlled so that a cane of glass is drawn from the bottom of the crucible. This cane of glass is fed into a silica or borosilicate tube which is being drawn into a fiber. This results in an optical fiber in which the multi-component glass forms the core while the tube forms the cladding.

The foregoing brief description, as well as further objects, features and advantages of the present invenitation will best be understood from the following detailed description of a presently preferred, but nonetheless illustrative, embodiment in accordance with the present invention, with reference being had to the drawing wherein:

FIG. 1 is a sectional view diagramatically illustrating the process of the invention being performed with conventional apparatus; and FIG. 2 is a detailed view, on an enlarged scale, showing the typical cross section of an optical fiber immediately after drawing.

In describing the invention, reference will be made to the use of a batch material for forming a multi-component core glass; however, as explained below, the process of the invention may start with a pure cullet.

As used herein, the term "batch material" means an ingredient used to form glass. In most cases these ingredients (or glass components) are oxides which are mechanically mixed and melted. Upon cooling, the glass is formed. Commonly, these ingredients are referred to as glass formers, glass modifiers and fluxes. In some cases, a batch material may be pre-reacted, for example, by heating to facilitate outgassing. Glass may include one or several of these components depending on the properties desired. In the case of optical fibers, the principal properties of concern (besides purity) are index of refraction, viscosity, thermal expansion and stability.

Various different batch materials may be used to make optical fibers in accordance with the invention. Examples of such batch materials are given below, with percentages specified by weight.

EXAMPLE 1

$SiO_2$: 68%
$BaO$: 22%
$K_2O$: 10%

EXAMPLE 2

$SiO_2$: 27%
$BaO$: 51%
$B_2O_3$: 22%

EXAMPLE 3

$SiO_2$: 54%
$BaO$: 46%

EXAMPLE 4

$SiO_2$: 78%
$BaO$: 22%

EXAMPLE 5

$SiO_2$: 90%
$PbO$: 10%

EXAMPLE 6

$SiO_2$: 50%
$PbO$: 50%

EXAMPLE 7

$SiO_2$: 30.2%
$PbO$: 69.8%

Referring now to the details of the drawing, there is illustrated a process for forming a low-loss optical fiber 10 having a core 12 and a cladding 14. The process is performed with the aid of a conventional crucible 16, preferably made of high purity silica. At its lower end, crucible 16 includes an orifice 16a and a depending neck 18 which provides a passageway 18a leading away from orifice 16a. Crucible 16 contains a core or batch material 20, for example one of the batch materials described above, and heating sources 22 and 24 are disposed, respectively, on crucible 16 and neck 18 to regulate the temperature of the core material within crucible 16. Preferably, heating sources 22 and 24 are a resistance or induction furnace and maintain the temperature of the core material in the range of 1000° C. to 1500° C. This temperature control permits a fine strand or cane of core glass 26 to be drawn from neck 18. Typically, this cane would be about ⅛ inch in diameter.

It will be appreciated that since the batch material 20 is melted in the crucible 16, impurities and imperfections evolved during this process and as a result of any reaction between the material 20 and crucible 16 are left in the crucible and not carried further in the process. Thus, the cane 26 is quite pure and free of imperfections.

A tube 30, preferably of silica or borosilicate, is substantially axially aligned with neck 18, so that the cane 26 can be drawn through the interior of the tube 30. At its lower end, tube 30 is heated by means of a source 32, preferably a laser, a carbon resistance furnace or a zirconia induction furnace, which maintains a temperature in the range of 1,800° C. to 2,000° C. for silica and a temperature in the range of 1,000° C. to 1,200° C. for borosilicate. This temperature range permits the lower end of tube 30 to be drawn, along with the cane 26 until they fuse at their interface and form a strand measuring several thousandths of an inch in diameter. The resulting fiber optic 10 has a core 12 composed of the batch material 20 and a cladding layer 14 composed of the material of tube 30.

There are no basic limitations on the length of tube 30, except practical limitations of space. Typically, the process would be performed with a 3-4 foot length of tube which would yield about 50 Km of optical fiber. The process would be substantially faster if borosilicate is used as the cladding owing to its faster draw rate, and would also then be substantially more energy efficient, owing to the lower temperature required to draw borosilicate.

Instead of forming the core glass from batch material 20 within crucible 16, previously melted ultra-pure glass which is in powder or granular form (hereinafter referred to as "cullet") may be used as a raw material. To obtain a highly purified cullet suitable for use in manufacturing a low loss fiber, the glassy liquid within crucible 16 may be quenched in ultra-pure deionized water (for example). This will cause the glass to solidify in the form of a granular or powder-like cullet. The cullet may then be stored (under ultra-clean conditions) until it is to be used, at which time the cullet is melted and fined. The advantage in using a cullet is that the two melting steps may provide better out-gassing, thus yielding less bubbles and better homogeneity.

Other techniques may also be used to provide a suitable cullet. For example, in a "skull" melting technique, a "skull" of pure glass is first coated on a container. The pure glassy liquid from which the cullet is to be formed is then melted in the skull and the cullet formed by quenching the glassy liquid.

In practice, it has been found that the process of the invention provides a fiber optic with a relatively high purity multicomponent core (and therefore low loss). Numerical apertures can be obtained in the range of 0.1 to 1.0 and the surface compression range is 0 to 85,000 PSI. Inasmuch as the process continues as long as tube material is available to be drawn (up to eight hours with a typically used length), it is well suited to semi-continuous large scale production. In addition, no pre-forms are required, so that manufacturing costs should be lower than other processes currently being used.

Although a preferred form of the invention has been disclosed for illustrative purposes, it will be appreciated by those skilled in the art that many additions, modifications and substitutions are possible without departing from the scope and spirit of the invention as disclosed in the accompanying claims. For example, the same process could be utilized with less pure materials, such as inexpensive borosilicate tubing, to make a conventional medium or high loss optical fiber at substantially lower cost than present processes permit.

What is claimed is:

1. A process for making an optical fiber, said process utilizing a crucible having a bottom with an orifice therein, said process comprising the step of:
    melting a core material having a first refractive index;
    drawing a cane of said core material from said aperture and through the interior of a tube composed of cladding material having a refractive index less than the refractive index of said batch material; and
    drawing one end of said tube simultaneously with said cane so that an optical fiber is formed having a core composed of said core material and a cladding composed of said cladding material, said drawn tube end being heated sufficiently to cause said cane and said tube to fuse at their interface.

2. The process of claim 1 wherein said core material is a multi-component glass and said crucible is made of high purity silica.

3. The process of claim 1 wherein said tube is made of one of silica and borosilicate.

4. The process of claim 1 wherein said crucible is maintained at a temperature in the range of 1,000 degrees C. to 1,500 degrees C.

5. The process of claim 1 wherein the portion of said tube being drawn is maintained at a temperature in the range of 1,800 degrees C. to 2,000 degrees C.

6. The process of claim 1 wherein the portion of said tube being drawn is maintained at a temperature in the range of 1,000 degrees C. to 1,200 degrees C.

* * * * *